US009221018B1

(12) United States Patent
Harris

(10) Patent No.: US 9,221,018 B1
(45) Date of Patent: Dec. 29, 2015

(54) LIGAND BASED FORWARD OSMOSIS

(75) Inventor: James M. Harris, Menlo Park, CA (US)

(73) Assignee: Crystal Clear Technologies, Inc., Portland, OR (US)

( * ) Notice: Subject to any disclaimer, the term of this patent is extended or adjusted under 35 U.S.C. 154(b) by 721 days.

(21) Appl. No.: 12/188,907

(22) Filed: Aug. 8, 2008

Related U.S. Application Data

(60) Provisional application No. 60/954,695, filed on Aug. 8, 2007.

(51) Int. Cl.
*B01D 61/00* (2006.01)
*B01D 67/00* (2006.01)
*C02F 1/44* (2006.01)
*C02F 103/08* (2006.01)
*B01D 69/12* (2006.01)

(52) U.S. Cl.
CPC ............ *B01D 61/002* (2013.01); *B01D 61/005* (2013.01); *C02F 1/445* (2013.01); *B01D 67/0088* (2013.01); *B01D 67/0093* (2013.01); *B01D 2321/06* (2013.01); *C02F 2103/08* (2013.01)

(58) Field of Classification Search
CPC ............... B01D 61/002; B01D 61/005; B01D 2321/06; C02F 1/445
See application file for complete search history.

(56) References Cited

U.S. PATENT DOCUMENTS

| 3,130,156 | A | * | 4/1964 | Neff | 210/177 |
| 4,920,105 | A | * | 4/1990 | Zelman | 514/59 |
| 5,679,254 | A | * | 10/1997 | Chakrabarti | 210/642 |
| 2006/0177489 | A1 | * | 8/2006 | Massouda et al. | 424/443 |
| 2006/0237366 | A1 | * | 10/2006 | Al-Mayahi | 210/644 |

FOREIGN PATENT DOCUMENTS

| WO | WO 2005/012185 | * | 2/2005 |
| WO | WO 2006/047577 | * | 5/2006 |

* cited by examiner

*Primary Examiner* — Katherine Zalasky
(74) *Attorney, Agent, or Firm* — Fernandez & Associates, LLP

(57) ABSTRACT

Forward osmosis methods and apparatus using a supported osmotic agent to establish or enhance an osmotic forward bias are disclosed. A supported osmotic agent may be assisted by osmotic agents not attached to a support and/or a pressure differential between an influent and effluent chamber and/or a temperature gradient and/or other means to increase the osmotic pressure in an effluent chamber.

6 Claims, 8 Drawing Sheets

FIGURE 2a

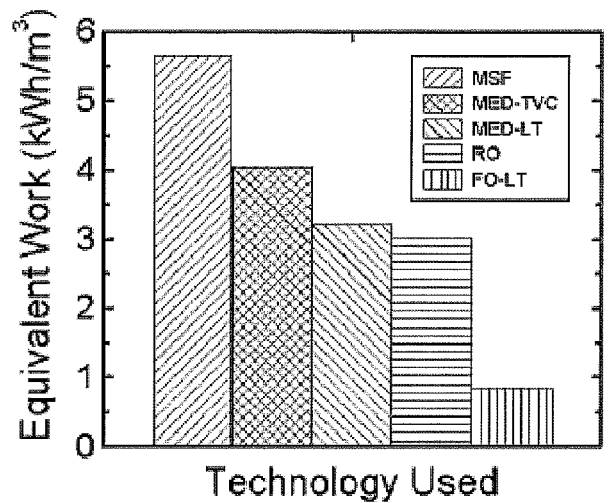

Equivalent work comparison of seawater desalination technologies. Data are summarized in

FIGURE 2b

Comparison of energy requirements of current seawater desalination technologies to the ammonia–carbon dioxide FO process. Data for MSF, MED-TVC, and MED low temperature were taken from Morin et al. [11] and for RO from Alvontis et al. [15]. Data for FO are from Table 1

| Technology | GOR | Electrical energy (kWh/kgal) | Electrical energy (kWh/m³) | Steam pressure (psia) | Equivalent work (kWh/m³) | Percent energy savings using low temp. FO |
|---|---|---|---|---|---|---|
| MSF | 12 | 10.04 | 2.65 | 25.7 | 5.66 | 85.1% |
| MED-TVC | 14.73 | 6.04 | 1.60 | 25.7 | 4.05 | 79.2% |
| MED-low temp. | 12 | 6.04 | 1.60 | 6 | 3.21 | 73.8% |
| RO-energy recovery | n/a | 11.43 | 3.02 | n/a | 3.02 | 72.1% |
| FO (low temp, 1.5 M feed) | 4.4 | 0.92 | 0.24 | 1.07 | 0.84 | |

Phosphonic acids for absorption to titanium oxide particles.

1　　　　　　2　　　　　　3

Silanes used to functionalize silica zeolite.

A crystal structure of the cavitand　which can be likened to a deep bowl · in which a guest can reside

Figure 8

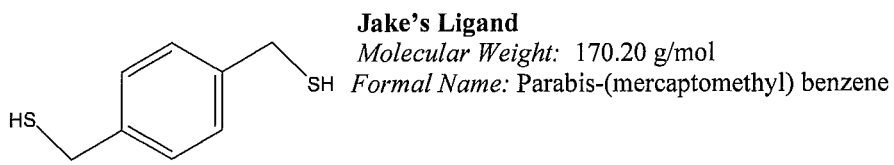

Jake's Ligand
*Molecular Weight:* 170.20 g/mol
*Formal Name:* Parabis-(mercaptomethyl) benzene

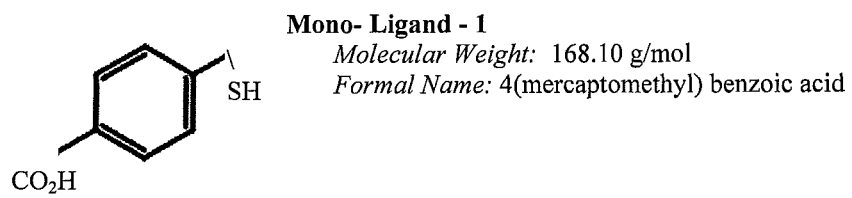

Mono- Ligand - 1
*Molecular Weight:* 168.10 g/mol
*Formal Name:* 4(mercaptomethyl) benzoic acid

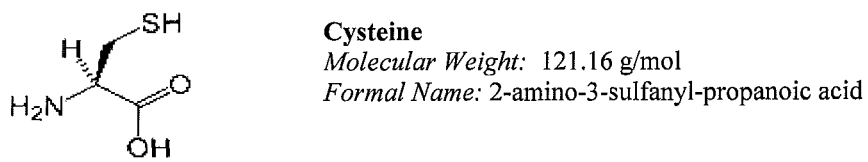

Cysteine
*Molecular Weight:* 121.16 g/mol
*Formal Name:* 2-amino-3-sulfanyl-propanoic acid

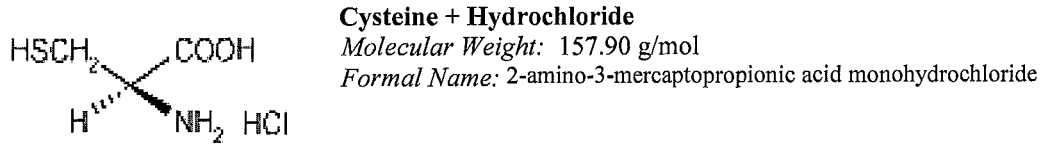

Cysteine + Hydrochloride
*Molecular Weight:* 157.90 g/mol
*Formal Name:* 2-amino-3-mercaptopropionic acid monohydrochloride

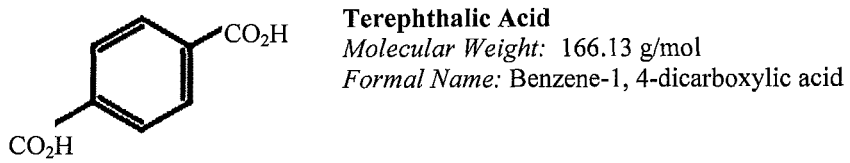

Terephthalic Acid
*Molecular Weight:* 166.13 g/mol
*Formal Name:* Benzene-1, 4-dicarboxylic acid

LIGAND BASED FORWARD OSMOSIS

CROSS-REFERENCE TO RELATED APPLICATIONS

"Water Purifier with UV and Adsorbent"; Ser. No. 11/297,163; filed on Dec. 7, 2005. "Adsorbent with Multiple Layers"; Ser. No. 11/350,202; filed on Feb. 7, 2006. "Mesoporous Layer and Substrate for Fluid Filtration"; Ser. No. 60/845,079 (Provisional); filed on Sep. 15, 2006 and U.S. 60/954,695 filed on Aug. 8, 2007; all share an inventor with the current application; all included herein in their entirety by reference.

PRIORITY

This application claims priority from U.S. 60/954,695 filed on Aug. 8, 2007

INCORPORATION-BY-REFERENCE

Prior art and pertinent information is contained in U.S. Pat. No. 6,849,184, U.S. Pat. No. 6,846,554, U.S. Pat. No. 6,326,326, U.S. Pat. No. 6,080,319, U.S. Pat. No. 6,838,005, U.S. Pat. No. 6,786,336, U.S.2002/0043496, U.S.20080149561, U.S. Pat. No. 6,849,184, U.S.2006/0144789, U.S.2006/0011544, U.S.2005/0133447, U.S.2006/0226067, U.S.2007/0278153, U.S.2008/0105618; all patents and applications listed are included herein in their entirety by reference.

BACKGROUND OF THE INVENTION

1. Field of the Invention

The invention pertains to the field of fluid separation using forward osmosis. Forward osmosis methods and apparatus using a supported osmotic agent to establish or enhance an osmotic forward bias are disclosed. A supported osmotic agent may be assisted by osmotic agents not attached to a support and/or a pressure differential between an influent and effluent chamber and/or a temperature gradient and/or other means to increase the osmotic pressure in an effluent chamber.

2. Description of Related Art

The use of semi-permeable membranes as a separation barrier between two solutions not in osmotic equilibrium is well known, and was first described in the French scientific literature in the mid 1700's. Such membranes permit passage of a solution's solvent but not its solute. A starting solution to be treated/filtered consisting of a certain solute molality is considered the influent. An ending solution after treatment/filtration consisting of a certain solute molality is considered the effluent. An osmotic differential between the two solutions exists when the molality of the effluent is different from that of the influent. To create a forward osmotic bias for the influent solvent, the effluent solute molality or osmotic potential must be greater than the influent solute molality or osmotic potential.

Molality refers to the number of solute molecules per liter of solution. In general, the greater the number of solute molecules in a solution, the greater is its osmotic pressure as compared to a solution lacking that solute. This solute differential creates an osmotic imbalance and natural forces of osmotic pressure drive solvent across a semi-permeable membrane separating the influent from the effluent until an osmotic equilibrium is reached between the two solutions. Take for example an influent that is fresh water and an effluent that is sea water; the solute is sea salt and the solvent is fresh water. Because the effluent has a higher molality of solute or osmotic pressure, fresh water will pass through the membrane to the effluent until an osmotic balance is reached.

Reverse osmosis, RO, accomplishes this objective by forcibly attempting to pass a solute-containing solution across a semi-permeable membrane whereby the membrane "filters" out the solute (e.g., sea salt, etc.) and passes the solvent to create solvent-only effluent (e.g., fresh water). However, reverse osmosis has a host of deficiencies including high energy requirements, membrane integrity during use and storage, and complexity.

In order for forward osmosis, FO, to work, the effluent, or draw solution, must have a solute molality or osmotic potential greater than the solute molality or osmotic potential of the influent, or feed solution. Problematically, however, the effluent is often fresh water (a common solvent) of exceptionally low solute molality. One solution used in prior efforts has been to benignly increase the effluent solute molality through the introduction of beneficial solutes such as carbohydrates and/or electrolytes. Thus, while accomplishing an objective of forward osmosis, e.g., the creation of potable water from non-potable water without the deficiencies of reverse osmosis, the effluent is not substantially pure, fresh water; it still contains the solute adjuncts or osmotic by-products.

The concept of forward or direct osmosis as a practical commercial process has been recognized since at least the 1930's. See, for example, U.S. Pat. No. 2,116,920. This patent discloses the use of a concentrated sugar and $CaCl_2$ aqueous solution to "pull" water out of fruit juices. The general process has been in continuous commercial use to manufacture fruit juice concentrates since at least that time. The concept of a removable "driving solute" in forward osmosis driven separation is articulated by Charles Moody in his 1977 dissertation. He outlines the use of dissolved $SO_2$ as an osmotic agent that would increase an effluent's molality above that of sea water, thereby creating a forward osmotic bias that would cause fresh water migration through a semi-permeable membrane from a sea water influent. The $SO_2$ would then be removed from the effluent by increasing the effluent temperature to drive it out as a gas.

In U.S. Pat. No. 3,617,547, an approach similar to that of U.S. Pat. No. 6,391,205 is disclosed. In both cases, an osmotic agent composed of salts, whose solubility is very temperature dependent, is used to increase an effluent's molality above that of sea water, thereby creating a forward osmotic bias that would cause fresh water migration through a semi-permeable membrane from a sea water influent. The osmotic agent is removed by lowering the solution temperature to precipitate the solute out of solution. The precipitate is removed, re-dissolved in water aided by heating and then recycled. These processes are encumbered by the energy inefficient need to chill all of the permeate and recycle streams, as well as the need to reheat the recycle.

Keith Lampi et al. in U.S. Pat. No. 6,849,184 describe a novel approach of obtaining fresh water from impure or sea water by a combination of forward osmosis and reverse osmosis. Salt and sea water are introduced into a chamber with two semi permeable membranes and then sealed; the introduced solution, therefore, has a molality greater in comparison to that of ordinary sea water. Ordinary sea water is then exposed to a first one of the two semi permeable membranes, which causes the sea water solvent, i.e., fresh water, to cross the first membrane. As the fresh water passes through the first membrane and into the sealed chamber, the internal pressure of the sealed chamber increases.

Cascade Designs of Seattle discloses in published application, WO 2006/047577, May 4, 2006 a FO apparatus employing a protein/nanomagnetic complex of particles such as dried, powdered Magnetoferritin supplied by Nanomagnetics, Bristol, UK. The invention is directed to forward osmosis methods and apparatus employing at least one controllable osmotic agent. Basic apparatus embodying the invention comprise at least one semi-permeable hydrophilic or hydrophobic membrane as a separation barrier between a first fluid solution (influent), comprising a first solvent, and a second fluid solution (effluent) comprising a second solvent. To create a forward osmotic bias from the influent to the effluent, apparatus embodying the invention comprise at least one controllable osmotic agent added to the effluent to create an osmotic imbalance that favors migration of the first fluid solution solvent to the second fluid solution. The resulting osmotic imbalance permits the natural forces of osmotic pressure to drive the first solvent of the influent across the at least one semi-permeable membrane into the effluent until an osmotic equilibrium is reached between the two fluid solutions or the supply of influent ceases. Basic apparatus according to the invention may further comprise means for isolating, removing or neutralizing the at least one controllable osmotic agent from the effluent. A component of the methods and apparatus disclosed herein is a controllable osmotic agent. As used in the application, the term "controllable osmotic agent" is defined as a substance that alters the osmotic potential between a first fluid solution exposed to one side of a solvent semi-permeable membrane, and a second fluid solution exposed to the other side of the membrane, where the influence of the substance on the osmotic potential across the membrane can be manipulated. Thus, a controllable osmotic agent according to the invention is one that a) dissolves, or is suspendable in the second fluid solution such that it is able to establish or enhance an osmotic driving force across the membrane relative to the first fluid solution exposed to the other side of the membrane; and b) possesses at least one chemical or physical property, or combination of the two, that allows for its removal, neutralization or separation from the second fluid solution by means that do not appreciably affect the solvent of the second fluid solution. A controllable osmotic agent present in embodiments of the invention is one that is responsive to magnetic forces and/or electric fields, allowing it to be magnetically and/or electrically influenced, and thus separated from the second fluid through standard magnetic separation techniques that otherwise have no appreciable effect on the second fluid solution solvent. Other examples include, but are not limited to, osmotic agents that are removed/reduced through filtration, chemical precipitation, chelation, oxidation/reduction reactions, distillation, evaporation, pressure adjustments/manipulations, temperature adjustments/manipulations, electro-chemical means, capacitive deionization and other means known to those skilled in the art.

In recent bench-scale studies by McCutcheon and co-workers at Yale University, it was demonstrated that when using a suitable FO membrane (e.g. the FO CTA membrane) and a strong draw solution (highly soluble ammonia and carbon dioxide gases), seawater can be efficiently desalinated with FO. The draw solution was formed by mixing together ammonium carbonate and ammonium hydroxide in specific proportions. The salt species formed include ammonium bicarbonate, ammonium carbonate, and ammonium carbamate. Analysis of the process has shown that an osmotic pressure driving force ($O\pi$) as high as 238 bar for a feed water with a salt concentration of 0.05 M NaCl, and as high as 127 bar for a feed water with a salt concentration of 2 M NaCl, can be achieved with the ammonia/carbon dioxide draw solution. This is a rather high driving force considering that 2 M NaCl is equivalent to brine from seawater desalination at approximately 70% water recovery.

In the novel ammonia-carbon dioxide FO process water is extracted from seawater and dilutes the ammonia-carbon dioxide draw solution; FIG. 1 schematically shows a desalination process based on this concept; note the "Draw solute recovery" unit. Upon moderate heating (near 60° C.), the draw solution decomposes to ammonia and carbon dioxide. Separation of the fresh product water from the diluted draw solution can be achieved by several separation methods (e.g., column distillation or membrane distillation (MD)). The degasified solution left behind is pure product water and the distillate is recovered draw solution available for reuse in the FO desalination process.

Bench-scale FO data demonstrates that the ammonia-carbon dioxide FO process is a viable desalination process. Salt rejections greater than 95% and fluxes as high as 25 L/m² h were achieved with the FO CTA membrane with a calculated driving force of more than 200 bar. Although this is a relatively high flux, much greater flux is actually expected for such a high driving force. Further analysis of the results has indicated that the performance ratio (defined as experimental water flux divided by theoretical water flux) of the FO CTA membrane used was at most 20%, and on average between 5% and 10%. FIGS. 2a and 2b show current energy requirements for various desalination technologies as reported by McGinnis, et al.

All of the previous, yet limited, work on FO as an alternative desalination process has exposed the two major limitations of FO—lack of high-performance membranes and the necessity for an easily separable draw solution. Moreover, when considering seawater desalination, and especially when high water recovery is desired, FO can be utilized only if the draw solution can induce a high osmotic pressure.

In view of the foregoing, a forward osmosis process and related apparatus that produces an effluent having a solute concentration less than the concentration used during the osmotic process is desirable; preferably solute concentration of a permeate is quite small to non-detectable.

BRIEF SUMMARY OF THE INVENTION

Basic methods embodying the invention comprise isolating a first fluid solution (influent) having a first solvent from a second fluid solution (effluent), optionally having a second solvent, with at least one semi-permeable hydrophilic or hydrophobic membrane; optionally a membrane may be spiral wound or hollow fiber membrane modules; introducing at least one first osmotic agent attached to a solid surface to an effluent chamber in sufficient amounts to create an osmotic imbalance between the influent and the effluent; and permitting solvent from the influent to pass through the at least one semi-permeable membrane to a second or effluent chamber. In some embodiments a solid surface may be one or more membrane layers attached to the at least one semi-permeable membrane, as shown in FIG. 3; in some embodiments a solid surface may be a mesoporous substrate; in some embodiments a solid surface may be a wall or surface of a container. Further methods according to the invention comprise adding at least one or more second osmotic agents in the effluent. A first osmotic agent may comprise at least two active portions wherein a first active portion is chosen based on a solid surface composition and a second or third or more active portions is chosen based upon osmotic agent characteristics desired; optionally a linking portion connects the active portions. The at least one or more second osmotic agents in the effluent are chosen based on cooperation and interaction with the one or more first osmotic agents; a second key feature of second osmotic agents is the ease with which they may be removed from the effluent solution; in some embodiments second osmotic agents are removed by their own vapor pressure. In some embodiments first osmotic agents are sufficient to enable acceptable FO processes; in some embodiments second osmotic agents act in concert with first osmotic agents and, optionally, remain in the effluent until removed.

One key feature of the instant invention is that at least one osmotic agent is attached to a support which remains in the effluent chamber and does not pass out of the chamber with diluted effluent. The energy required to remove or isolate or sequester a supported osmotic agent from an effluent is zero or minimal.

The use of at least one osmotic agent to create or enhance an osmotic driving force is not exclusive. It may be used in conjunction with other osmotic pressure enhancement compositions and/or methods, such as adding pressure to an influent, increasing the trans-membrane flux rate such as by increasing the area of the membrane, or by altering the influent's chemistry through precipitation, chelation, pH adjustments, sequestering agents, cleaning and anti-fouling agents, temperature alterations, and other means known to those skilled in the art.

BRIEF DESCRIPTION OF THE SEVERAL VIEWS OF THE DRAWING(S)

FIGS. 2a and 2b are reported and calculated energy requirements for desalination of sea water by distillation, RO and FO processes by McGinnis.

Figure 7A:
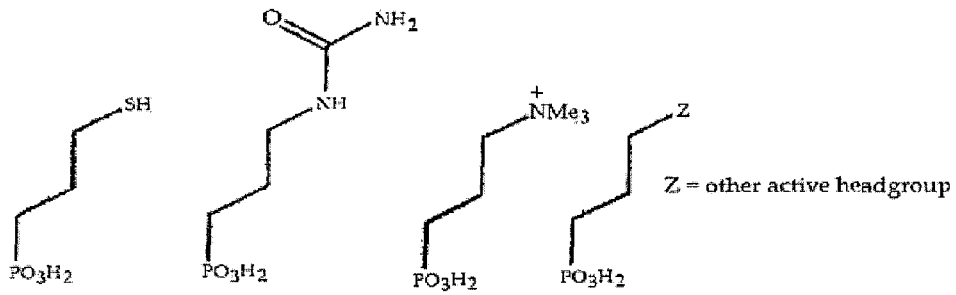

FIGS. 7a, b and c additional example ligand/osmotic agents.

FIG. 8 shows additional example ligand/osmotic agents.

DETAILED DESCRIPTION OF THE INVENTION

The following discussion is presented to enable a person skilled in the art to make and use the invention. Various modifications to the described embodiment will be readily apparent to those skilled in the art, and the generic principles herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

In one embodiment a ligand comprising one or more active groups is attached to a mesoporous substrate such as boehmite, titania, or other synthetic or natural mineral. The substrate is placed in fluid contact with a semi-permeable membrane. A "feed solution" or influent is placed on the upside of a membrane. In one embodiment there is no fluid initially on the other side, or "permeate side" of a membrane. In some embodiments a feed solution is sea water; alternatively a feed solution may be non-potable water; alternatively it may be industrial waste water; alternatively it may be non-aqueous, such as an alcohol or hydrocarbon-based fluid or other organic fluid; optionally mixed with water or not.

In one embodiment a ligand comprising one or more active groups attached to a substrate is chosen to have a high surface charge, optionally positive or negative. One or more active groups may disassociate in a solvent to achieve a high surface charge density. In some embodiments a second compound is added to a chosen solvent to assist a selected active group disassociate while remaining bound to a substrate. In some embodiments a second compound, acting as a second osmotic agent is disassociated by an active group bound to a substrate. In some embodiments a first active group may bind to a surface of a membrane like material; in this case a second active group is attached through an intermediate linking group to the first active group; the second active group has high surface charge or other property giving it high osmotic pressure characteristic. In some embodiments an intermediate linking group may link to more than two active groups.

Optionally, active groups and ligands functioning as an osmotic agent to increase the osmotic potential of a solvent are similar to those described in U.S. application Ser. No. 11/350,202, now U.S. Pat. No. 7,491,669.

A membrane is, optionally, for example, a sheet of asymmetric hydrophilic cellulose acetate nano-filtration membrane similar to those available from Hydration Technologies, Inc. of Albany, Oreg.; optionally a membrane is similar to one described in U.S. 2006/0226067; alternatively a membrane may be part of a membrane unit as a SEPA cell from GE Osmonics of Trevose, Pa. In some embodiments a membrane is at least one semi-permeable hydrophilic or hydrophobic membrane; optionally a membrane may be spiral wound or hollow fiber membrane modules.

Figure 1:
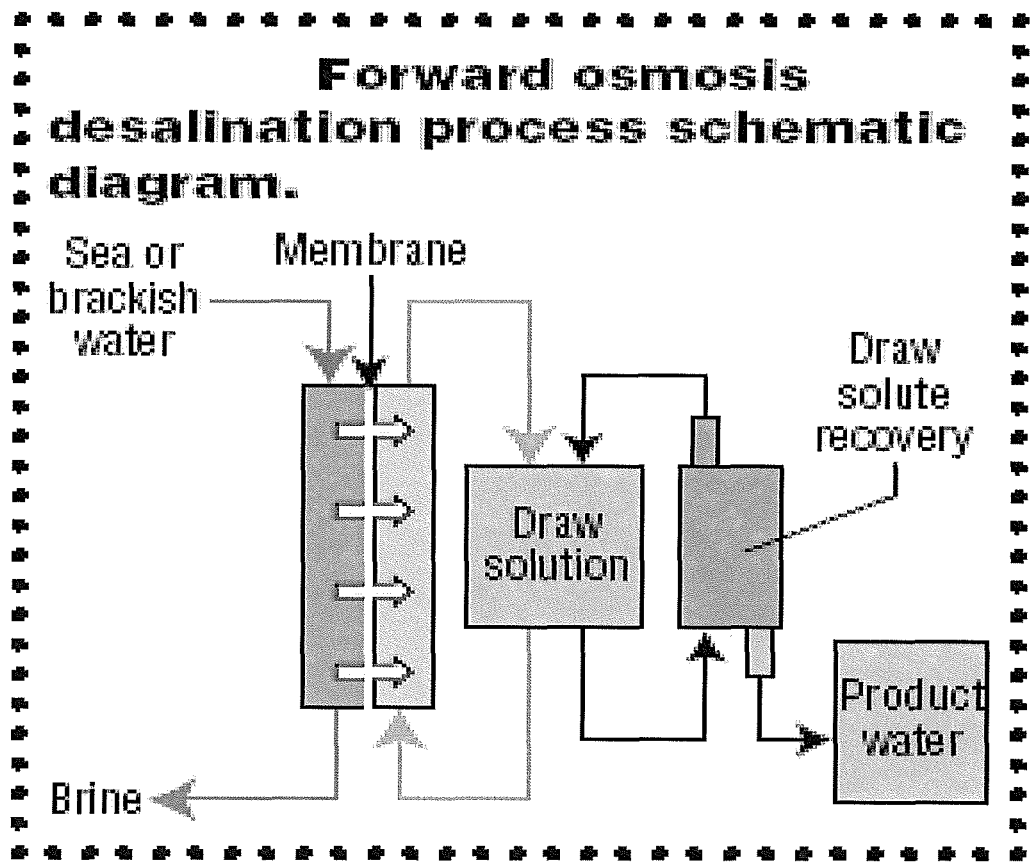
FIG. 1 is a schematic of a FO system as disclosed by McCutcheon and co-workers.
Figure 3:
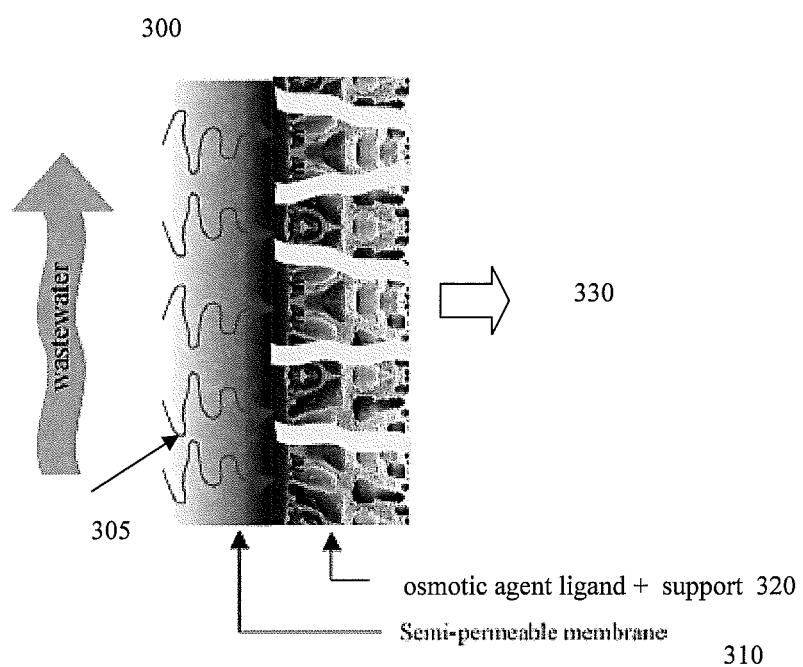
FIG. 3 is a drawing of a membrane plus osmotic agent and support in a FO system.

FIG. 3 shows an example embodiment; forward osmosis system 300 has "waste water" 305 passing through semi-permeable membrane 310. Waste water 305 is acted upon by osmotic potential difference created by the osmotic potential of 305 versus the osmotic potential of osmotic agent ligand plus support 320, in fluid communication with waste water 305. Semi-permeable membrane 310 prevents solute components of 305 from passing into osmotic agent ligand plus support 320; effluent 330 is measurably improved water as compared to 305. In some embodiments a multi-step process may be needed to achieve an acceptable purity of water for various applications such as drinking water or an industrial application such as integrated circuit manufacture. In some embodiments the osmotic potential difference provided by 320 is sufficient to "pull" water 305 across membrane 310; in some embodiments additional forces may be added such as pressure or temperature differential.

In another embodiment a second osmotic agent is added to a effluent side; in one example carbon dioxide or a precursor is added to increase a osmotic potential. The key characteristic is that the added osmotic agent(s) are not bound to a support as a first osmotic agent(s) is.

Figure 4:
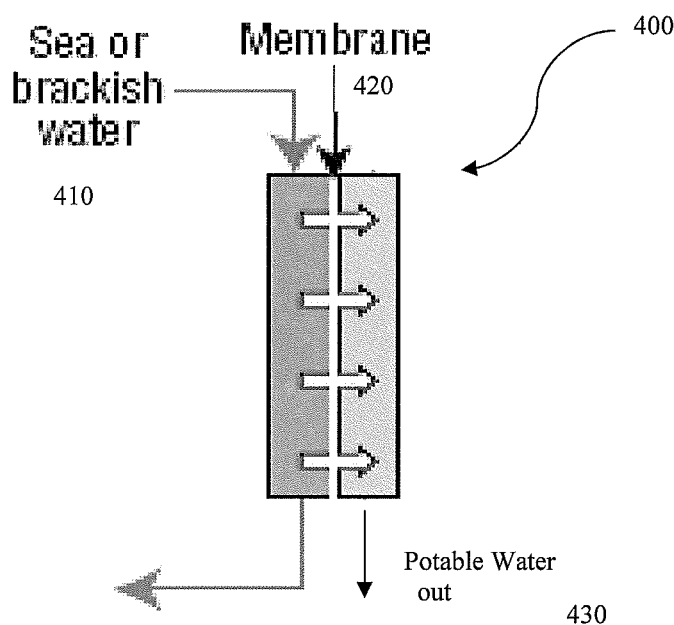
FIG. 4 shows an embodiment with no draw water.

Another embodiment is a continuous process, as shown schematically in FIG. 4. Sea water, contaminated water, or other forms of influent solutions to be purified are represented as influent water 410, which is supplied to an influent side of membrane 420; 420 may be one or more membranes and, optionally, comprise one or more osmotic agent ligands plus support in fluid communication with one or more semi-permeable membranes. Potable water 430 flows out of FO apparatus 400 under gravity in one embodiment; influent 410 flows or is pumped pass membrane 420. In another embodiment effluent 430 is pumped out of FO apparatus 400. In the instant invention there may be no actual "draw solution"; in one embodiment the influent or feed solution supplies the first liquid into the effluent side of a water purifier and the fluid is continuously replaced by additional fluid from the influent side.

Figure 5:
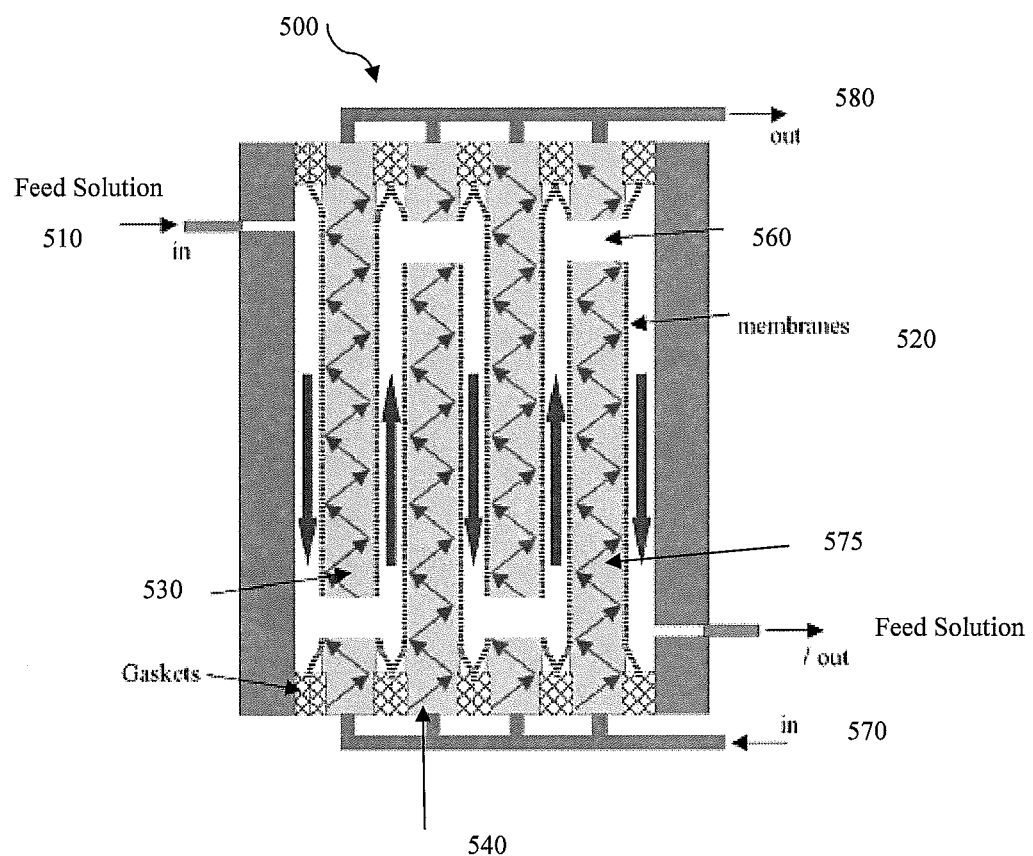
FIG. 5 is a schematic process flow diagram for a multi-filter process for the desalination of sea water or the purification of water using FO.
Figure 6:
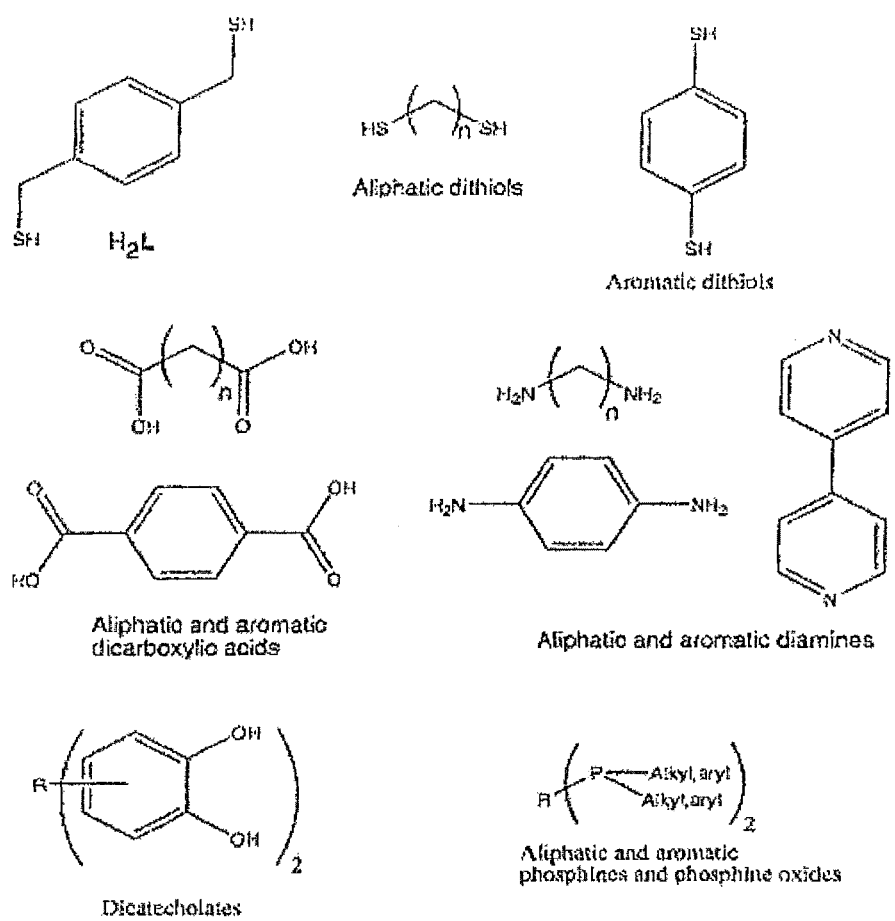
FIG. 6 shows example ligand/osmotic agents.

Another embodiment is a continuous process FO apparatus 500, as shown schematically in FIG. 5. Sea water, contaminated water, or other forms of influent solutions to be purified are represented as feed solution 510, which is supplied to apparatus 500. Feed water 510 is optionally filtered (not shown), and enters forward osmosis (FO) unit 500. FO unit 500 preferably includes semi-permeable membranes 520. Supported osmotic agent 530 are located in chambers 540 or, optionally attached to membranes 520 as discussed in FIG. 3. Supported osmotic agent 530 are surface charged enough and/or at high enough concentration such that the osmotic potential of effluent solution 570 while in chambers 540 is higher than that of feed water 510. Feed solution 510 while in flow paths 560 has a lower osmotic potential than effluent solution 575 while 575 is in fluid communication with osmotic agent 530. Note that effluent solution entering 500 may be at some composition 570; while traversing FO 500 effluent is of composition 575 which varies as effluent makes its way through 500; upon exiting effluent is at some composition 580, representing a gradual dilution of effluent with permeate from 510. Optionally, effluent 570 may comprise one or more second osmotic agents upon entering or shortly after entering, not shown. As those persons skilled in the art will appreciate, FO unit 500 could be any one of a number of design configurations, including but not limited to, spiral wound, hollow fiber, or flat sheet.

Supported osmotic agents comprising active groups, linking groups and substrate may be used multiple times; in some embodiments additional ligand comprising active groups and linking groups may be added to a substrate already in place in a water purifier.

In one embodiment supported osmotic agents comprise an ammonia active group and a carboxyl active group; alternatively a carboxyl active group is added as a liquid or gas to an entering effluent solution and an ammonia active group is a supported osmotic agent ligand. As used herein, influent solution refers to one wherein the solvent is crossing a semi-permeable membrane to an effluent solution; in the prior art a feed solution is also an influent solution and a draw solution is also an effluent solution.

As the skilled practitioner will appreciate, concentration polarization becomes a limiting factor in either forward osmosis or in reverse osmosis. Essentially, the boundary layer adjacent to the semi-permeable membrane becomes too concentrated in solute on the influent side and too diluted with driving solvent on the effluent side, thereby adversely affecting the forward osmotic driving force. High fluid velocities and mixing are usually used to mitigate this inherent problem.

In one embodiment a supported osmotic agent active group may be placed in very close proximity to a membrane, thereby increasing the localized concentration of the supported osmotic agent active group adjacent to a membrane.

In one embodiment a second, unsupported osmotic agent is a carboxyl ion; in one embodiment a second, unsupported osmotic agent is carbon dioxide bubbled through an effluent solution.

A metal complex, also known as coordination compound, is a structure composed of a central metal atom or ion, generally a cation, surrounded by a number of negatively charged ions or neutral molecules possessing lone pairs. Counter ions often surround the metal complex ion, causing the compound to have no net charge. The ions or molecules surrounding the metal are called ligands. Ligands are generally bound to a metal ion by a coordinate covalent bond, and are thus said to be coordinated with the ion. The process of binding to the metal ion with more than one coordination site per ligand is called chelation. Compounds that bind avidly to form complexes are thus called chelating agents (for example, EDTA). Coordination numbers, or the number of bonds formed between the metal ions and ligands, may vary from 2 to 8. The number of bonds depends on the size, charge, and electron configuration of the metal ion. Some metal ions may have more than one coordination number. Different ligand structural arrangements result from the coordination number. A coordination number of two corresponds with a linear geometry; a coordination number of four corresponds with either a tetrahedral or square planar molecular geometry; and a coordination number of six corresponds with an octahedral geometry. Simple ligands like water or chlorine form only one link with the central atom and are said to be monodentate. More examples of monodentate ligands include hydroxide, nitrite, and thiocyanate. Some ligands are capable of forming multiple links to the same metal atom, and are described as bidentate, tridentate etc. Oxalate and ethylenediamine (en) are examples of bidentate ligands, while diethylenetriamine (dien) is a tridentate ligand. EDTA is hexadentate, which accounts for the great stability of many of its complexes. Herein the terms coordination site, attraction site, binding site, linking site and interaction site are used approximately equivalently.

Previous work with coated or surface-modified zeolites may be found in U.S. Pat. No. 6,080,319 and U.S. 2004/0108274; both disclose methods for adsorbing contaminants, including pathogens, onto a porous substrate such as zeolite. U.S. Pat. No. 6,838,005 teaches a nano-porous, synthetic substrate of aluminum hydroxide fibers for adsorption purposes. U.S. 2004/0108274 discloses HDTMA as a ligand with a charged active group for attracting charged molecules; HDTMA is a candidate osmotic agent ligand.

Ligands of interest in some embodiments are prepared by a method of Johnson and co-workers as described in "Arsenic-π Interactions Stabilize a Self-assembled $As_2L_3$ Supramolecular Complex"; Angew. Chem. Int. Ed. 2004, 43, 5831, incorporated by reference herein in its entirety. The trigonal-pyramidal coordination geometry of As(III) features a stereochemically active lone pair when coordinated by sulfur-based ligands and is predictable enough to be exploited as a target for specific ligand design. Treatment of N-(2-mercaptoethyl)-1,8-naphthalimide (HL) with stoichiometric amounts of $AsCl_3$ and base affords $AsL_2Cl$ and $AsL_3$ complexes stabilized in part by secondary As . . . O bonding interactions. The use of these secondary bonding interactions (SBI's) between As(III) and heteroatoms of appropriate ligands offers a complementary tool for designing ligands specific for this ion. Secondary bonding interactions are observed between main group metals and heteroatoms such as O, N, S or halogens with interatomic distances less than the sum of the corresponding van der Waals radii. These interactions have only recently been systematically studied in the context of supramolecular chemistry and they offer a potentially useful method towards designing chelators optimized to bind main group metalloids. The β-mercaptoimido ligand represents two examples of SBI's between an imido oxygen of a ligand and the central arsenic atom of the complex.

The characteristic coordination of As(III) by sulfur-containing biological molecules such as glutathione or cysteine has recently been reported in the context of developing a better understanding of arsenic toxicity. However, there are relatively few known structures of arsenic thiolate complexes: a search of the Cambridge Structure Database (CSD) reveals only 59 examples of an As(III) ion coordinated by one or more thiolate organic ligands. Of these examples, only three complexes demonstrate As . . . O SBI's within the range of 2.7 to 3.2 Å. The use of thiolate ligands optimized for the specific pyramidal coordination geometry of As(III) that possess additional functional groups capable of exhibiting secondary bonding interactions is relevant towards designing specific chelators and sensors for this toxic main group element. One class of ligands used for the instant invention is of the benzyldithiol family; alternatives are shown in FIG. 2. Initial data indicate that the ligands are not toxic to humans or animals.

Suitable substrates for an osmotic agent ligand based coating comprise titania, zeolites, surface-modified zeolites, carbon, natural minerals or synthetic resins, with a macro, micro or nano porous structure and other materials known to one knowledgeable in the art; alternatively plastic, glass, steel and other materials of filter construction may be used. In some embodiments, an osmotic agent's contribution to overall osmotic potential is a function of how many charges it manifests; each substrate material/osmotic agent ligand combination has a different capacity based on its surface structure and cumulative osmotic agent charges. Application of a ligand based coating to a substrate may be prepared by coating first with a compound which can functionalize a substrate's surface enabling a preferred osmotic agent ligand based layer to be coated on to a prepared substrate. Alternatively, a substrate may require no special pretreatment apart from cleaning to remove debris or other foreign material; in these cases a bi- or multi-functional osmotic agent ligand attaches directly to active sites on a substrate and has one or more coordination sites available. In one embodiment an article of manufacture for FO comprises a substrate comprising a porous structure and at least one interaction or attachment site in combination with at least one ligand comprising at least two coordination or attachment sites, wherein the at least one ligand binds to the at least one substrate attachment sites by one of the at least two ligand coordination sites.

Figure 7B:
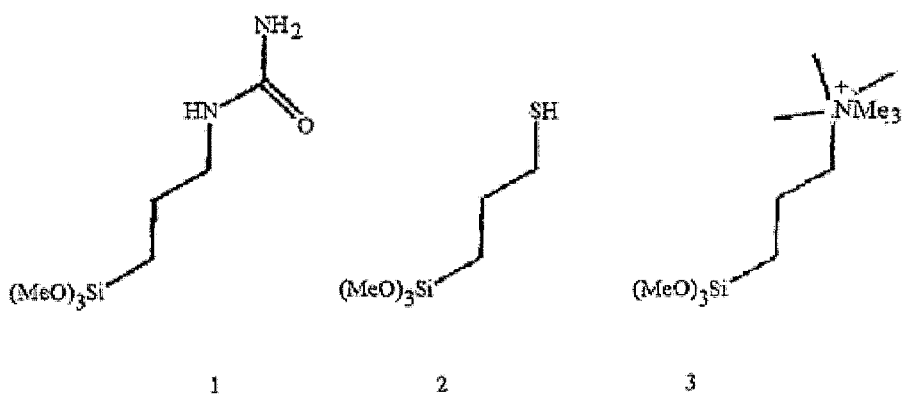
Figure 7C:
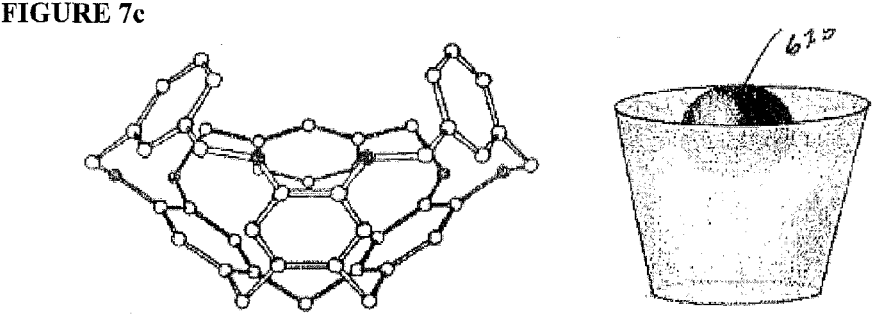

Turner, in "Molecular Containers: Design Approaches and Applications" discusses numerous "molecular containers", completely enclosed hollow species capable of holding one or more guest species inside, and their ability to form a covalent assembly of "guest-encapsulating host species"; the first examples of host species binding their guests within a three-dimensional array of interactions were the class of compounds known as cryptands, discussed in a 1969 article; typically cryptands are synthesized by the addition of a diacyl-chloride to an a zacrown ether. Turner describes other molecular shapes such as a cavitand, which can be likened to a deep bowl in which a guest can reside, shown in FIG. 7c. Turner describes carcerands and hemicarcerands wherein a guest specie is enclosed by a cage compound; in one embodiment a cavitand "captures" a specie suitable as an osmotic agent. A cavitand or other suitable molecule is bound to a substrate and holds a guest specie osmotic agent such that it is in fluid communication with an influent solution across a semi-permeable or other appropriate membrane.

In an alternative embodiment a first coordination site of a first ligand may attach directly to a substrate site and a first osmotic agent active group attach to at least a second coordination site of first ligand; optionally additional osmotic agent active group attach to a second or more coordination sites. Alternatively, a substrate may first be treated or coated with a material which functionalizes a surface in order to enhance attachment of a first osmotic agent active group. Examples of such materials for functionalizing are phosphonic acids, examples shown in FIG. 7a, silanes, examples shown in FIG. 7B, or other organic or inorganic compounds, such as a cavitand in FIG. 7c, which may coordinate simultaneously with a chosen substrate-ligand pair or substrate-osmotic agent active group pair; some examples are metallic thin films, carbon nano-tubes and nanospheres, metallic nano-tubes and nanospheres, ceramic nano-tubes and nanospheres, proteins and organic templates; others are known to one knowledgeable in the field.

FIG. 8 contains examples of ligand/osmotic agent active group candidates. These molecules may be used directly to attach to a substrate or in combination to attach to a substrate and then coordinate with a particular osmotic agent active group.

In some embodiments a support for an osmotic agent may comprise chitin or chitosan or a chitosan/cellulose mixture; a chitosan material may be cross linked, or not; additional ligands may be added to a chitosan or chitosan/cellulose structure to facilitate it acting as a support; cellulose addition and/or the cross linking and/or ligand addition serve to form a "modified chitosan". Optionally, a modified chitosan may act either as a support or as a supported osmotic agent or both simultaneously; optionally a modified chitosan may be formed around a hard particle following examples taught by Boddu in U.S. Pat. No. 6,786,336 and others of her publications. In some embodiments a "modified chitosan" may be formed as a hollow fiber after Bai (2007) and an osmotic agent placed on the interior, optionally, exterior, of the hollow fiber. Optionally, one type of osmotic agent may be on the exterior and another type on the interior.

Examples of materials of utility in some embodiments are found in U.S.2008/0149561; specifically, polyalcohols such as polyvinyl alcohol, cationically modified polyvinylalcohol, anionically modified polyvinylalcohol; polysaccharides such as chitosan, hyaluronan, cellulose, regenerated cellulose, cellulose ethers such as methylcellulose, ethylcellulose, hydroxyethyl cellulose, cellulose esters such as cellulose acetates (including mono-, di-, and tri-acetates); proteins such as collagen, gelatin, etc.; ionomers; polyalkylene oxides such as polyethylene oxide, polypropylene oxide, polyethylene glycols, crosslinkable polyethylene glycol, etc.; polyurethanes; polyureas; poly(urethane-urea); polyimines such as polyethylene imine; polyvinylpyrrolidone; polyacrylic acids; polymethacrylic acids; polysiloxanes such as polydimethylsiloxane; poly(ester-co-glycol) copolymers; poly(ether-co-amide) copolymers; and mixtures, derivatives, copolymers and crosslinked forms of any of the above. Derivatives include ethers, esters, amides, etc. formed by alkylation, acylation etc. of functional groups (e.g., hydroxyl or amine groups), or by hydrolysis of hydrolyzable functional groups (e.g., esters, amides, anhydrides, etc.) present in the polymer of which the nanofiber is comprised. In particular embodiments, the nanofibers of the fibrous supports comprise polyacrylonitrile (PAN), polyethersulfone (PES), polyvinylidenefluoride (PVDF), crosslinked water-soluble polymers such as polyvinyl alcohol, polyvinylpyrrolidone, modified cellulose, modified chitosan, etc. Other possibilities for modifying chitosan include water soluble polymers such as polyvinyl alcohol, polysaccharides (e.g., chitosan and hyaluronan), polyalkylene oxides (e.g., polyethylene oxide), gelatin and derivatives can be cross-linked using methods known in the art. For example, polymers containing hydroxyl or amine groups (e.g., polyvinyl alcohols, polysaccharides, proteins, etc.) can be cross-linked using aldehydes (e.g., formaldehyde), dialdehydes (e.g., $C_2$-$C_8$ dialdehydes such as glutaraldehyde, glyoxal), mono-aldehydes having acid functionality (e.g., glyoxylic acid), polycarboxylic acids (e.g., oxydisuccinic acid, citric acid), etc. These compounds are capable of reacting with at least two hydroxyl (or amine) groups of a water-soluble polymer. Other crosslinking methods include thermal and radiation crosslinking methods (photo crosslinking, electron beam crosslinking, gamma crosslinking, etc.) of polymers optionally modified with, or mixed with, suitable cross-linking and radiation sensitizing agents/catalysts. In some embodiments a chitosan based polymer may comprise additional sugar or polysaccharide compounds to increase its osmotic activity; in one embodiment glucose type compounds are linked to a chitosan structure for increased osmotic activity.

Examples of acceptable membranes for separating an influent and effluent chamber are given in U.S.2008/0149561, including the prior art discussed therein.

In some embodiments a method for producing a purified effluent solution or concentrating an influent solution, comprises separating a first influent fluid solution comprising a first solvent from a second effluent fluid solution comprising a second solvent with at least one membrane; introducing at least one supported osmotic agent to the second effluent fluid solution in sufficient amounts to create an osmotic potential higher than exists in the first influent fluid solution such that diffusion of the first influent solution solvent to the second effluent fluid solution occurs through the at least one membrane to the second solution; optionally a method further comprises a step of adding a second osmotic agent to said second effluent fluid solution wherein the second osmotic agent in cooperation with said at least one supported osmotic agent increases the osmotic potential of said second effluent fluid solution; optionally a method further comprising a step of increasing the osmotic potential of the second effluent fluid solution by choosing at least one of the following steps on said first influent fluid solution wherein the step is raising the pressure, increasing the temperature or both; optionally a method includes said second solvent and said first solvent are the same, optionally water or a biological based fluid such as blood or other solution; optionally a method includes wherein said at least one supported osmotic agent comprises a modified chitosan and/or wherein the support of said at least one supported osmotic agent comprises a modified chitosan.

In some embodiments an apparatus for producing a purified effluent solution or concentrating an influent solution, comprises first and second fluid chambers; a first fluid solution comprising a first solvent; at least one membrane, separating a portion of the first and second fluid chambers, wherein the at least one membrane is permeable to the first solvent in the first fluid chamber; and at least one supported osmotic agent within the interior space of the second fluid chamber, whereby upon exposure to the at least one membrane, the first solvent passes through the at least one membrane and establishes fluid communication with the at least one supported osmotic agent; optionally, the first fluid chamber has at least one discharge port to facilitate continuous discharge of the first fluid solution during operation of the apparatus; optionally, the second fluid chamber has at least one discharge port to facilitate continuous discharge of the first fluid solution solvent during operation of the apparatus; optionally, an apparatus further comprises at least one unsupported osmotic agent in said second fluid chamber cooperating with said at least one supported osmotic agent; optionally, at least one supported osmotic agent comprises a modified chitosan; optionally, at least one supported osmotic agent comprises a modified chitosan.

Foregoing described embodiments of the invention are provided as illustrations and descriptions. They are not intended to limit the invention to precise form described. In particular, it is contemplated that functional implementation of invention described herein may be implemented equivalently. Alternative construction techniques and processes are apparent to one knowledgeable with organic and/or physical chemistry. Other variations and embodiments are possible in light of above teachings, and it is thus intended that the scope of invention not be limited by this Detailed Description, but rather by Claims following.

Following are incorporated by reference in their entirety:

"Forward Osmosis: A new Approach to Water Purification and Desalination"; Miller, James E., et al.; Sandia Report, SAND2006-4634, July 2006. Sandia National Laboratories.

U.S.2007/0278153; Oriard, T., et al.; "Forward Osmosis Utilizing A Controllable Osmotic Agent"; May 4, 2006.

"Internal concentration polarization in forward osmosis: role of membrane orientation"; Gray, G. T., et al.; Desalination 197 (2006) 1-8.

"Forward Osmosis: Principles, applications and recent developments"; Cath, T. Y., et al.; Jl. Membrane Science, 281, (2006) 70-87.

"A novel ammonia-carbon dioxide forward (direct) osmosis desalination process"; McCutcheon, J. R., et al.; Desalination 174 (2005) 1-11.

"Influence of concentrative and dilutive internal concentration polarization on flux behavior in forward osmosis"; McCutcheon, J. R., et al.; Jl. Membrane Science, 284, (2006) 237-247.

"Desalination by ammonia-carbon dioxide forward osmosis: Influence of draw and feed solution concentrations on process performance"; McCutcheon, J. R., et al.; Jl. Membrane Science, 278, (2006) 114-123.

"Energy requirements of ammonia-carbon dioxide forward osmosis desalination"; McGinnis, R. L., et al.; Desalination 207 (2007) 370.

"Membrane contactor processes for wastewater reclamation in space II."; Cath, T. Y., et al.; Jl. Membrane Science, 257, (2005) 111-119.

U.S. Pat. No. 6,849,184; Feb. 1, 2005; Lampi, K., et al.; "Forward Osmosis Pressurized Device and Process for Generating Potable Water".

"The Ammonia-Carbon Dioxide Forward Osmosisi Desalination Process"; McCutcheon, J. R., et al.; Water Conditioning & Purification, October 2006.

"Forward Osmosis for Concentration of Anaerobic Digester Centrate"; Holloway, Ryan W.; University of Nevada, Reno, June 2006.

"Forward (Direct) Osmosis: A Novel and Prospective Process for Brine Control"; Ng, H. Y., et al.; WEFTEC.06.

"Removal of Natural Steroid Hormones for Wastewater using Membrane contactor Processes"; Cartinella, J. L., et al.; Environ. Sci. Technol. 2006, 40, 7381.

U.S. 2006/0011544; published Jan. 19, 2006; Sharma, Sunity, et al.; "Membrane Purification System".

U.S. 2006/0144789; published Jul. 6, 2006; Cath, T. Y., et al.; "Systems and Methods for Purification of Liquids".

U.S. 2006/0226067; published Oct. 12, 2006; Herron, Jack; "Asymmetric Forward osmosis Membranes".

U.S. 2004/0108274; published Jun. 10, 2004; Schulze-Makuch, D., et al.; "Removal of Biological Pathogens using Surfactant-modified Zeolite".

"Adsorption of Proteins on Mesoporous Molecular Sieves"; Kisler, J. M., et al.; Mater. Phys. Mech. 4 (2001) 89.

"Actinide Sequestration using self-assembled Monolayers on Mesoporous Supports"; Fryxell, G. E., et al.; Environ Sci. Technol. 2005, 39, 1324.

U.S. Pat. No. 6,846,554; Jan. 25, 2005; Fryxell, G. E., et al.; "Self-assembled monolayer and method of making".

U.S. Pat. No. 6,326,326; Dec. 1, 2001; Fryxell, G. E., et al.; "Surface Functionalized Mesoporous material and method of making".

"Ethylenediamine-modified SBA-15 as Regenerable CO2 Sorbent"; Zheng, F, et al.; 10.1021/iie049488t; American Chemical Society; February 2005.

"SAMMS Technical Summary"; Fryxell, G. E., et al.; Pacific Northwest National Laboratory; Rev. 3, August 2003.

Turner, David R., et al.; Molecular Containers: Design Approaches and Applications"; Structure and Bonding, Vol. 108, 2004, 97. Springer-Verlag.

Caulder, Dana L., et al.; "The rational design of high symmetry coordination clusters"; J. Chem. Soc. Dalton Trans., 1999, 1185.

Castellano, Ronald K., et al.; "Formation of Discrete Functional Assemblies and Informational Polymers through the Hydrogen-bonding Preferences of Calixarene Aryl and Sulfonyl Tetraureas"; J. Am. Chem. Soc., 1998, 120, 3657.

Vickaryous, W. J., et al.; "Arsenic-II Interactions Stabilize a Self-assembled As2L3 Supramolecular Complex"; Angew. Chem. Int. Ed. 2004, 43, 5831.

U.S. Pat. No. 6,080,319, U.S. Pat. No. 6,838,005, U.S. Pat. No. 6,786,336, U.S.2002/0043496, U.S.20080149561, U.S. Pat. No. 6,849,184, U.S.2006/0144789, U.S.2006/0011544, U.S.2005/0133447, U.S.2006/0226067, U.S.2007/0278153, U.S.2008/0105618; U.S. Pat. No. 6,849,184, U.S. Pat. No. 6,846,554, U.S. Pat. No. 6,326,326.

Renbi Bai, Jl. Membrane Science, 302, (2007) 150.

We claim:

1. A method for producing a purified effluent solution or concentrating an influent solution, comprising:
    separating a first influent fluid solution comprising a solvent from a second effluent fluid solution comprising the solvent with at least one semi-permeable hydrophilic or semi-permeable hydrophobic membrane;
    introducing at least one supported osmotic agent to the second effluent fluid solution to create an osmotic potential higher than exists in the first influent fluid solution such that diffusion of the solvent to the second effluent fluid solution occurs through the at least one said semi-permeable hydrophilic or hydrophobic membrane;
    attaching the said supported osmotic agent to a solid surface in a chamber containing the second effluent fluid solution such that the supported osmotic agent does not detach during the diffusion with the second effluent fluid solution; wherein the solid surface comprises a plurality of membrane layers attached to the said at least one semi-permeable membrane and wherein the said supported osmotic agent is attached to at least one of the membrane layers; and wherein the second effluent solution has a solute concentration less than that prior to the said diffusion.

2. The method of claim 1 further comprising increasing the osmotic potential of said second effluent fluid solution, wherein the said increasing further comprises adding a second osmotic agent to said second effluent fluid solution wherein the second osmotic agent is caused to work in cooperation with said at least one supported osmotic agent to increase the said osmotic potential.

3. The method of claim 1 further comprising the step of increasing the osmotic potential of the second effluent fluid solution by raising the pressure, increasing the temperature or both on the said first influent fluid solution.

4. The method of claim 1 wherein said second solvent and said first solvent are the same.

5. The method of claim 1 wherein said at least one supported osmotic agent comprises a modified chitosan.

6. A method for producing a purified effluent solution or concentrating an influent solution, comprising:
    separating a first influent fluid solution comprising a solvent from a second effluent fluid solution comprising the solvent with at least one semi-permeable hydrophilic or semi-permeable hydrophobic membrane;
    establishing an osmotic forward bias by introducing at least one osmotic agent to the second effluent fluid solution to create an osmotic potential higher than exists in the first influent fluid solution such that diffusion of the solvent to the second effluent fluid solution occurs through the at least one said semi-permeable hydrophilic or hydrophobic membrane; wherein the osmotic agent is attached to a solid surface which comprises a plurality of membrane layers or a mesoporous substrate;
    introducing a single or plurality of osmotic agents not attached to the solid surface; and
    introducing at least one of a pressure differential and a temperature gradient between the first influent and the second effluent solution.

* * * * *